United States Patent

[11] 3,524,391

| [72] | Inventor | Tatsuo Fujii |
| --- | --- | --- |
|  |  | Tokyo, Japan |
| [21] | Appl. No. | 680,079 |
| [22] | Filed | Nov. 2, 1967 |
| [45] | Patented | Aug. 18, 1970 |
| [73] | Assignee | Nippon Kogaku K.K., |
|  |  | Tokyo, Japan |
|  |  | a Corp. of Japan |
| [32] | Priority | Nov. 7, 1966 |
| [33] |  | Japan |
| [31] |  | No. 41/72873 |

[54] EXPOSURE DETERMINING DEVICE
8 Claims, 7 Drawing Figs.

[52] U.S. Cl. ................................................ 95/10,
356/222, 356/227
[51] Int. Cl. .................................................. G01j 1/16,
G03b 7/02
[50] Field of Search .......................................... 95/10C
64; 356/218, 222, 227

[56] References Cited
UNITED STATES PATENTS

| 2,444,674 | 7/1948 | Rath ........................... | 356/222 |
| --- | --- | --- | --- |
| 3,409,378 | 11/1968 | Shimomura .................. | 356/222 |

FOREIGN PATENTS

| 1,355,542 | 2/1964 | France ..................... | 95/10(C)UX |
| --- | --- | --- | --- |

Primary Examiner— Norton Ansher
Assistant Examiner— Joseph F. Peters, Jr.
Attorney— Anton J. Wille ABSTRACT: An exposure determining device is provided for a camera wherein the correct exposure value for an object or scene to be photographed is obtained by considering an intermediate value for the photometric responsiveness to the light and dark portions of the object. Two exposure meters are provided having different light responsive sensitivities to the same degree of illumination, the two meters being interlocked mechanically or combined electrically to utilize the difference between the indicated values.

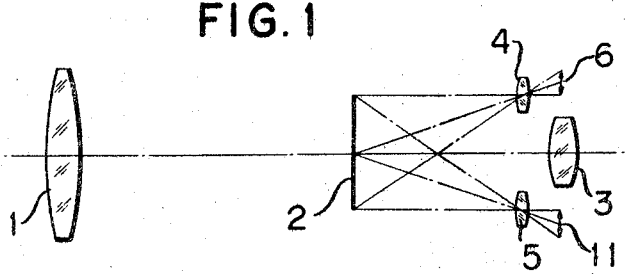
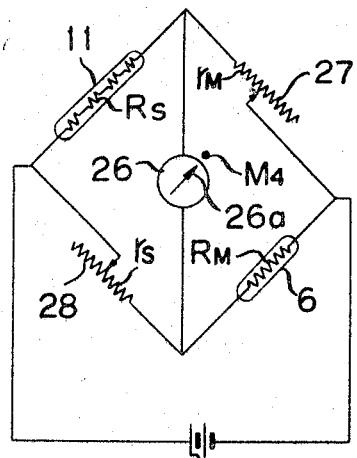
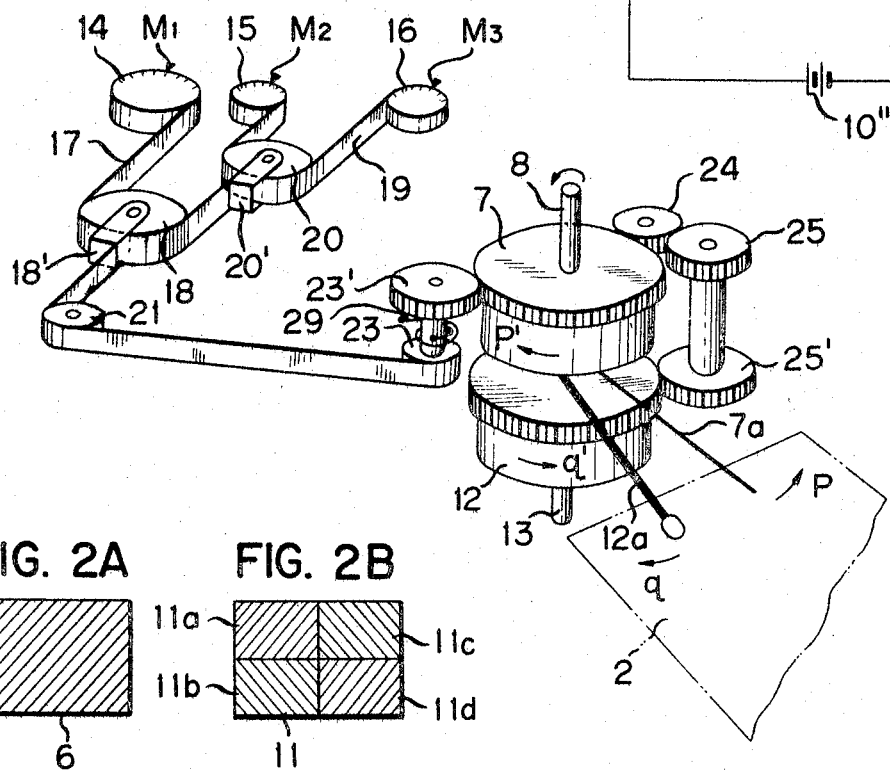
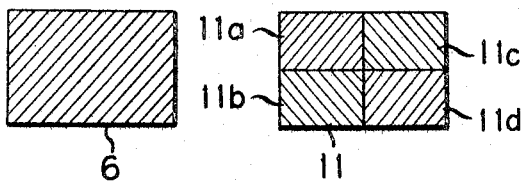
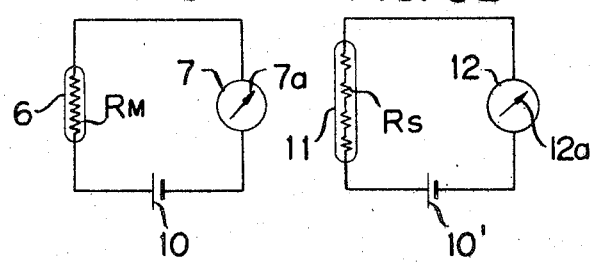

EXPOSURE DETERMINING DEVICE

The present invention relates to means for determining the exposure of a camera wherein photometric measurements are made through the lens.

The exposure of a camera is generally represented by an exposure value, and for that purpose, the exposure factors such as shutter time, diaphragm setting, and film sensitivity or the like (hereinafter these factors are called exposure factors) are of a multiplication system. In accordance with this system, the brightness and light distribution of the object to be photographed used as a standard are first determined in the planning process of an exposure meter. In order to facilitate the calculation of the exposure value and production of an exposure meter, in most cases, a plate having a uniform distribution of brightness and having a reflection rate of 18% is used when the exposure meter is adjusted; the brightness plate being assumed as an object to be photographed and the brightness considered as the standard. The combination of the respective exposure factors (respective exposure stage values) corresponding to the amount of the incident light at that time, is made to be the standard, and the calculation of exposure is carried out by the proportional relation to said standard value.

The proper exposure of the object is different depending on the differences of the distribution of brightness and the difference of the tone, or the intention of the photographer, although it may be the same even though the amount of light rays is the same. Therefore the combination of exposure factors as measured by the exposure meter cannot always be said to be correct. In addition, in an exposure meter wherein exposure is measured by receiving the entire amount of light rays of the image on a single photoconductive cell, the fine particles of photoconductive surface are considered to be connected as parallel. Thus, when an object to be photographed includes white clouds, snow, sky or sea, the weight on the side of the light portions is unreasonably increased, which is disadvantageous for correct exposure measurement.

In order to overcome this drawback, there has been proposed a system in which the object is optically divided into a plural number of portions, or is divided into a plural number of essential portions, and the photoconductive cells provided in the respective divisions are connected in series. The amount of the light rays within the respective divisions is detected, and the total of the resistivity is converted into an angle of deviation of the indicator or other physical displacement to determine the exposure value.

The prior art system has the disadvantage that when the width of the tone of brightness of the object is above a certain degree, the weight on the side of dark portion becomes greater, and an over-exposure results. On the other hand, in order to eliminate these drawbacks, the photoconductive cells provided on the respective portions are connected in series or in parallel, but even with this method a different value is presented depending upon the positions of the respective cells to the distribution of brightness of the object. In order to avoid this it has been proposed that a certain portion of the object is spot measured. However when the object has more than two important portions within the same image-field, the photographer himself must measure the exposure of the respective portions and must calculate the exposure value or the weight to determine the proper exposure, which is not only inconvenient, but is a drawback in making rapid sequential exposures.

The object of the present invention is to provide an exposure meter which overcomes the drawbacks of the conventional systems, and can automatically give the proper exposure under wide range of the different conditions.

The above object is attained by the present invention by considering the fact that the proper exposure is in an intermediate portion between the light and dark portions.

According to the present invention, two exposure meters having different sensitivities to the same light amount from an object to be photographed are provided, and utilizing the difference between the indicating values of two exposure meters by interlocking both exposure meters on the basis of a predetermined rate, the proper exposure is determined automatically.

Above object and other objects and advantages of the present invention shall be more apparent from the following explanation referring to illustrative embodiments shown in the drawing, in which:

FIG. 1 shows an arrangement of the light path of the present invention;

FIGS. 2(A), 2(B) and FIGS. 3(A), 3(B) show light receiving portions and associated exposure meters, respectively;

FIG. 4 is a perspective schematic view of an embodiment of the present invention; and FIG. 5 shows an electrical embodiment of the invention.

In the drawing, 1 is a camera lens, 2 is a focussing plate within a finder light path, 3 is a finder eye-piece, the three elements comprising a conventional view finder for a single lens reflex camera. Lenses 4 and 5 are spaced apart within the camera body and displaced from the eyepiece axis to project the light rays incident on plate 2 onto a light receiving portion 6 of a first exposure meter FIGS. 2(A) and 3(A) and onto a second light receiving portion 11 of a second exposure meter FIGS. 2(B) and 3(B). Portion 6 comprises a single photoconductor having a sensitivity $R_M$ and positioned in conjugate position with the focussing plate 2 through the lens 4. Portion 11 comprises a plurality of photoconductors, each of equal area and connected in series, the total resistivity of the portion 11 being $R_S$. Portion 11 is disposed conjugate with the focussing plate 2 through the lens 5; both portions 6 and 11 receiving the light rays incident over the entire area of the focussing plate. The areas 11a to 11d of the portion 11 correspond with similar areas of the focussing plate. Both of the photoconductor units are connected into a conventional exposure meter circuit as illustrated in FIGS. 3(A) and 3(B) wherein 10, 10' designate battery supply and 7, 12 designate a galvanometer with indicators or pointers 7a and 12a, respectively. In FIG. 4, it will be noted that the ends of the pointers are dissimilar and are visible through the view finder eyepiece against the background of the focussing plate 2.

Both galvanometers 7 and 12 are mounted for rotation on coaxial shafts 8 and 13, respectively, the two galvanometers being provided with ring gears fixed on the peripheries thereof.

The current responsiveness of the two galvanometers is predetermined so that when a standard plate of brightness, previously mentioned, is used as the object or subject to be photographed, the two pointers of the galvanometers indicate an aligned standard deflection or position. When the brightness becomes $2^n$ times the standard brightness, the indicator 7a of the galvanometer of the first exposure meter is moved in the direction of the arrow p by the angle of $n \times \beta$, while the indicator 12a of the second galvanometer is moved in the direction of the arrow q by the angle of $n \times \beta \times k$. The photoconductive bodies 6 and 11 are preselected to have suitable photoresistive properties $R_M$ and $R_S$, respectively. Here, it is noted that n is the magnification represented by the number of exposure stages (hereinafter called stage-magnification), $\beta$ is the angle by which the indicator is moved per unit exposure stage, and k is a positive constant selected in view of design. The electric exposure stage value at the standard position is set to be Xo.

The shutter time setting member 14 is interlocked to the shutter (not shown) by conventional means, 15 is a diaphragm setting member interlocked with the stop ring (not shown) of the camera lens, 16 is a film speed or sensitivity setting member; the three members being independently rotatable and settable against fixed indices or marks M1, M2, and M3, respectively. Interconnecting the three members are three pulley belts or ribbons 17, 19 and 22. One end of the ribbon 17 is fixed to the periphery of the shutter time setting member 14 and the other end thereof is fixed through a main differential pulley 18 to a bracket 20' of an auxiliary differential pulley 20. The one end of the ribbon 18 is fixed to the periphery of the diaphragm setting member 15 and the other end thereof is fixed to the periphery of the film sensitivity setting member 16 through the auxiliary differential pulley 20. The one end of the ribbon 22 is fixed to a bracket 18' of the main differential pulley 18 and the other end thereof is fixed to the periphery of a driving pulley 23 through a fixed guide roller 21.

The exposing operation of the shutter time setting member 14 is directly converted into the movement of the main differential pulley 18 through the ribbon 17, which is under tension. The operation of the film sensitivity setting member 16 and the diaphragm setting member 15, is converted into the movement of the auxiliary differential pulley 20 through the ribbon 19, which is under tension, the sum of the ribbon movement being applied to the main pulley 18 through the ribbon 17. Moreover, the amount of the movement of the main differential pulley 18 per unit exposure stage when the respective members from 14 to 16 are operated by the respective unit stages, should be adjusted to be equal so that the exposure value can be calculated in the usual manner. The movement of the main differential pulley 18 is transmitted to the driving pulley 23 through the ribbon 22 guided by the guide roller 21, and rotates the first galvanometer 7 through the driving gear 23' which is rotated together with said driving pulley 23.

The angle of mechanical rotation per unit exposure stage of the galvanometer 7 is predetermined to be equal to the angle of electrical movement $\beta$ of the indicator 7a or 12a when the adjustment is carried out as mentioned above. And when the brightness of the object under adjusted state becomes $2^n$ times the standard brightness, the respective stage values of the shutter time, diaphragm setting and film sensitivity are predetermined to be set relative to the respective stage values when the indicators 7a and 12a coincide with the standard positions as $2^{-A}$ times, $2 B/2$ times and $2^{-C}$ times, respectively, in which $A + B + C = N$ and $N = n$. It is noted that A represents exposure stages of shutter time, B represents exposure stages of diaphragm setting, C represents exposure stage of film sensitivity and N represents the total mechanical exposure stages having no relationship with brightness. It is assumed that the total mechanical exposure stage when the indicators 7a and 12a coincide with the standard positions is $Y_0$.

Intermediate gears 24, 25 and 25' interconnect two galvanometers 7 and 12, and gears 25 and 25' are rotated in unison. The toothed portions of the galvanometers 7 and 12 and gears 25 and 25' are selected to have appropriate gear ratios so that the two galvanometers can be mechanically and simultaneously rotated in the directions of p' and q' (direction in which N is increased) in accordance with a certain ratio such as, for example, 1:K, which is the constant multiplied to the indicator 12a of the galvanometer. This connection between two galvanometers may be made by using a ribbon so that transmission is made directly from the driving pulley 23 to either one shaft in the normal rotational direction and to the other shaft in the opposite rotational direction. It is to be noted that ribbon 17, 19 and 20 are always tensioned by a spring 29 for avoiding looseness of respective ribbon.

According to the above explained structure of the present invention, the proper exposure of an object when photometry is carried out is obtained by first detecting the brightness of the object as an angle of rotation of the indicators of the galvanometers which shows a number of multiplication of the brightness of the object calculated on the basis of the standard brightness, and then determining a number of mechanical exposure stages in accordance with said number of multiplication.

First of all, when the object is of the uniform brightness having no ratio of brightness, and if the brightness is $2^n$ times the standard brightness, the indicators 7a and 12a of the respective galvanometers 7 and 12 are moved electrically in the directions p and q in accordance with the magnification n of the number of stages. Therefore, when the galvanometers 7 and 12 are rotated mechanically in the directions of p' and q' by operating the respective members 14 to 16 so as to return the respective indicators 7a and 12a to the original positions in accordance with said angle of the rotation, the total mechanical exposure stage number becomes the number of stages of the proper exposure combination.

When it is presumed that the two indicators 7a and 12a are electrically rotated by the angle of $\theta_1$ and $\theta_2$ in the directions of p and q, and the electrical exposure stage values of the respective galvanometers 7 and 12 are presumed to be respectively $X_1$ and $X_2$, the electrical exposure stage numbers becomes as follows;

$$X_1 - X_0 = \frac{\theta_1}{\beta} = n, \quad X_2 - X_0 = \frac{\theta_2}{\beta \times x \times k} = n$$

The total exposure stage values (the total of the respective exposure factors) which are obtained by returning the indicators 7a and 12a by the angles corresponding to said angles of movements are $Y_1$ and $Y_2$, respectively, the mechanical exposure stages of the two galvanometers are also represented by $$N = Y_1 - Y_0 = \frac{\theta_1}{\beta} = n, \quad N = Y_2 - Y_0 = \frac{\theta_2}{\beta \times x \times k} = n$$

As mentioned above, the two galvanometers 7 and 12 are connected so that they can be rotated in opposite directions simultaneously, the two indicators 7a and 12a are aligned at the original standard positions, and the combination of the proper exposure can be obtained.

Next, the proper exposure, when the object has a ratio of brightness, i.e. when the object has irregularity of or patterns in brightness, is considered. It is presumed that the uniform brightness can be obtained within the range of the respective divisions of the light receiving portion 11 of the second exposure meter for the easy understanding. When the brightness of the object at the time of photometry is changed to $2^n$ times the standard brightness the indicators 7a and 12a of the respective galvanometers are electrically rotated in the directions of p and q, and the angles of rotations in this case are more or less different from the angles of rotations in the case of the object having uniform brightness. In other words, as mentioned above, in the light receiving portion 6 of the first exposure meter, all of the fine photoconductors are considered to have been connected in parallel, the signal due to the photoelectric resistivity of the dark portion of the object is reduced and as a result, the ratio on the light portion of the object is unreasonably increased as a whole, so that the angle of rotation of the indicator 7a becomes greater when compared with the case having an object of uniform ratio of brightness.

In other words, when the angle of rotation of the indicator 7a of the first exposure meter is presumed to be $\theta_3$, the following relations can be obtained.

$$\theta_3 < \theta_1 \therefore \theta_3 - \theta_1 = \phi_1$$

(where $\phi_1$ is the angle of deviation to the side of the light portion). In the light receiving portion 11 of the second exposure meter, the respective portions 11a through 11d are series connected, and therefore if there is a dark portion beyond a certain degree in one of the respective portions, the composite resistance thereof becomes greater even if other portions are brighter, and as a result, the ratio of the dark portion becomes unreasonably greater, and the angle of rotation of the indicator 12a becomes smaller than the case of the object having uniform brightness. Namely, the angle of rotation of the indicator 12a of the second exposure meter in this case is presumed to be $\theta_4$, the following relations can be obtained.

$$\theta_4 > \theta_2 \therefore \theta_2 - \theta_4 = \phi_2$$

(where $\phi_2$ is the angle of deviation on the side of dark portion). Since the two galvanometers 7 and 12 are mechanically coupled so that they can be rotated in the opposite directions based on a certain ratio, when mechanically turning back the respective indicators 7a and 12a to the standard position, the indicator 12a of the second exposure meter arrive at the standard position before the indicator 7a of the first exposure meter reaches the standard position. Namely there is a difference of the angle of $\phi_1 + \phi_2$, and with the continued rotation of the two galvanometers 7 and 12, the two indicators 7a and 12a are aligned at the position where the angle of $\phi_1 + \phi_2$ is interiorlly divided into the ratio of $\beta : \beta \times k$.

As mentioned above, the first exposure meter circuit of FIG. 3(A) shows the indication deviated to the light portion, and the second exposure meter circuit of FIG. 3(B) shows the indication deviated to the dark portion. A corrected exposure must exist between the indications of the two. Consequently, a number of the objects which can be generally used, are selected, and the ratio which can be adopted for the respective objects is obtained by taking into consideration the sensitivity of the exposure meter and the precision thereof. When the ratio is made equal to the constant k, it is possible to obtain the proper exposure by the agreement of the indicators of the two exposures.

As mentioned above, the present invention is based on the technical idea that the proper exposure is obtained by combining two exposure meters having different sensitivities to the same amount of light rays from the object, and the present invention is not restricted to the embodiment shown in the drawing. It is possible to use two exposure meters standardized on the light portion having different degrees of deviation, or it is also possible to use two exposure meters standardized on the dark portion. In these cases the indicators of the two galvanometers are rotated in the same direction. The two galvanometers are then mechanically interconnected so that the direction of the mechanical rotation of the two galvanometers becomes the same, and the differences of the rotation of the two indicators are agreed at the exterior division point of the two, so that proper exposure can be obtained.

FIG. 5 shows another embodiment which is carried out electrically and in the drawing 6 and 11 are the light receiving portions as in the preceding embodiment, and 10" is a battery, 26 is a galvanometer, 26a is the indicator thereof, $M_4$ is the reference point mark, and 27 and 28 are the variable resistances, the resistance elements being connected in a bridge circuit. This bridge circuit is in balance when the object in correction has the standard brightness, and the indicator 26a is aligned with the mark $M_4$. The resistivities of the members 6, 11, 27, and 28 are respectively set to be $R_{M0}$, $R_{s0}$, $r_{M0}$, and $4_{s0}$, the following relation can be obtained for the standard brightness.

$$\frac{R_{MO}}{r_{MO}} = \frac{r_{SO}}{R_{SO}}$$

The respective resistances in this case are made to be the respective standard resistances.

When the brightness of the object is changed to $2^n$ times the standard brightness, the respective light receiving portions 6 and 11 change the photoelectric resistivities respectively from $R_{M0}$ to $R_{M1}$, and from $R_{s0}$ to $R_{s1}$ according to the respective photoelectric converting properties, and therefore the bridge is unbalanced. In order to restore bridge balance, the variable resistances 27 and 28 must be changed from $r_{M0}$ to $r_{M1}$ and from $r_{s0}$ to $r_{s1}$ and the mutual relation of the changes of the respective resistances is that the changed portion $r_{M1} - r_{M0}$ of one of variable resistances 27 corresponds to the portion of the change of the resistance $R_{M1} - R_{M0}$ of the first light receiving portion 6, and the changed portion $r_{s1} - r_{s0}$ of the other variable resistance 28 corresponds to the portion of the change $R_{s1} - R_{s0}$ of the second light receiving portion 11. Therefore, the electric structure of the respective variable resistances 27 and 28 are predetermined so as to satisfy this condition in the respective stages of exposure.

In the same manner as in the case of the preceding embodiment, the two variable resistances 27 and 28 are connected so that the two are operated simultaneously while satisfying said conditions. When the respective exposure factor members 14 through 16 are integrated and operated by N exposure stages, the two resistances are operated so as to provide the direction of increase or decrease of the resistances and are integrated and interlocked to the respective members through the differential means.so as to carry out N exposure stage operation.

Next, when the object has the ratio of brightness, the resistance on the side of the series connected light receiving portion 11 becomes greater when compared with the state of adjustment, and therefore the variable resistance 27 on one side is operated in the same manner as in the state of adjustment, but the amount of the operation of other variable resistance 28 is not sufficient, and the indicator 26a does not agree with the mark $M_4$. When the operation is carried out so that the indicator 26a and the mark $M_4$ agree, the amount of the operation is increased (which means to deviate to the dark portion), and at the agreed position bridge equilibrium is attained. The indication at this time corresponds to the one interiorly dividing the indications obtained in FIGS. 3(A) and 3(B) in reverse proportion to the ratio of the so called $\gamma$ values of the light receiving elements 6 and 11, and thus the proper exposure is obtained. In this embodiment, by varying the ratio of $\gamma$ values of the both elements in accordance with the brightness of an object to be photographed, said interior division can be varied in accordance with the brightness.

When the present invention is employed in the manner described, the proper exposure of the object can be automatically obtained within wide ranges which could not be obtained by the prior art devices.

I claim:

1. An exposure determining device for a photographic instrument comprising, in combination:

first and second exposure meters including light receiving portions having different photo-sensitivities to the light incident on the same area of an object without uniform brightness and an indicating unit for each portion having an indicator actuated by its respective light receiving portion in response to the illumination of the object, means for forming two same images of the object on said two light receiving portions the electrical characteristics of said two exposure meters being so arranged that the response levels of said two indicators in response to a selected standard uniform brightness of a flat object, agree with each other, and when the brightness of said flat object becomes $2^n$ times the standard brightness, the level of one of said indicators changes to $n \times \beta$ while the level of the other of said indicators changes to $n \times \beta \times k$, where both $\beta$ and k are constant, and means for operating simultaneously said two indicating units in accordance with the exposure factor setting operations to shift the respective levels of said one of said indicators and said other thereof according to the ratio 1 : k so as to agree with each other.

2. An exposure determining device according to Claim 1, wherein the first light receiving portion of said first exposure meter consists of at least one photoconductive element responsive to the light of one of said two images and operable to vary an electrical signal in accordance with the degree of deviation of the light thereof, and the second light receiving portion of said second exposure meter consists of at least two photoconductive elements, connected to each other, responsive to the light of the other of said two images and operable to vary an electrical signal in accordance with the degree of deviation of the light thereof.

3. An exposure determining device according to Claim 2, wherein the indicating units of said two exposure meters are two galvanometers having respectively a movable indicator, the first galvanometer of said first exposure meter being rotatably mounted on the instrument body and the second galvanometer being coaxially rotatable with said first galvanometer, the respective indicators of the two galvanometers overlap each other by the relative rotation of the two galvanometers.

4. An exposure determining device according to Claim 3, wherein each of said galvanometers has a toothed portion around its external periphery and said operating means has a gear train connected to both of said toothed portions for the relative rotation of said two galvanometers.

5. An exposure determining device according to Claim 4, wherein said gear train includes a rotatable shaft, and a pair of toothed gears carried by said rotatable shaft, the first toothed gear meshing with said first galvanometer through an idle gear, the second toothed gear meshed directly with said second galvanometer, whereby each of said two indicators is moved in opposite direction to each other and wherein the gear ratio between said first and second toothed gears is 1:k.

6. An exposure determining device according to Claim 5, further comprising a plurality of exposure factor setting members, a differential mechanism connected to said setting members, and a third toothed gear rotated through said differential mechanism and meshed with said toothed portion of said first galvanometer, said second galvanometer being rotated through said gear train while said first galvanometer is rotated by said third toothed gear.

7. An exposure determining device according to Claim 2, wherein said image forming means includes an objective lens, a focusing plate on which an image of the object is formed by said objective lens, and two relay lenses for directing the light of said image respectively onto said two light receiving portions, each of said light receiving portions being placed at a position conjugate with said focusing plate with respect to its relay lens and has a shape and an opening determined to receive all of light rays incident on said focusing plate.

8. An exposure determining device accoding to Claim 7, wherein each of said indicating units is a galvanometer having an indicator, both of said indicators of said two exposure meters being visible against said focusing plate.